US012115674B1

(12) United States Patent
Yao

(10) Patent No.: US 12,115,674 B1
(45) Date of Patent: Oct. 15, 2024

(54) SELF-MOVING ROBOT, OBSTACLE CROSSING METHOD, OBSTACLE CROSSING SYSTEM AND COMPUTER-READABLE STORAGE MEDIUM

(71) Applicant: Dreame Innovation Technology (Suzhou) Co., Ltd., Jiangsu (CN)

(72) Inventor: Nan Yao, Jiangsu (CN)

(73) Assignee: Dreame Innovation Technology(Suzhou) Co., Ltd., Jiangsu (CN)

( * ) Notice: Subject to any disclaimer, the term of this patent is extended or adjusted under 35 U.S.C. 154(b) by 0 days.

(21) Appl. No.: 18/652,725

(22) Filed: May 1, 2024

(30) Foreign Application Priority Data

Mar. 14, 2024 (CN) .......................... 202410291902.9

(51) Int. Cl.
  *B25J 9/16* (2006.01)
  *B25J 11/00* (2006.01)
(52) U.S. Cl.
  CPC ......... *B25J 9/1666* (2013.01); *B25J 11/0085* (2013.01)
(58) Field of Classification Search
  CPC ... B25J 9/1666; B25J 11/0085; A47L 2201/04
  See application file for complete search history.

(56) References Cited

U.S. PATENT DOCUMENTS

| 2017/0090456 A1* | 3/2017 | Mao | ..................... G05D 1/0246 |
| 2022/0007908 A1* | 1/2022 | Wang | ..................... A47L 9/2826 |
| 2024/0182125 A1* | 6/2024 | Xu | ........................... B25J 9/163 |

FOREIGN PATENT DOCUMENTS

| CN | 110989631 A | 4/2020 |
| CN | 111067439 A | 4/2020 |
| CN | 111142526 A | 5/2020 |
| CN | 113093725 A | 7/2021 |
| KR | 20180120973 A | 11/2018 |
| WO | WO2023124788 A1 | 7/2023 |

OTHER PUBLICATIONS

Notification to Grant Patent Right for Invention dated Apr. 19, 2024 for Chinese Application No. 202410291902.9.

* cited by examiner

*Primary Examiner* — Khoi H Tran
*Assistant Examiner* — Nhi Q Bui

(57) ABSTRACT

A self-moving robot includes an active obstacle crossing component, and performs a cleaning task based on a preset cleaning frequency. An obstacle crossing method includes: identifying a type of an obstacle, and determining whether the obstacle is a first type of obstacle or a second type of obstacle according to a height rule, acquiring a first obstacle crossing frequency corresponding to the first type of obstacle, crossing over or not crossing over the first type of obstacle based on the first obstacle crossing frequency, where the first obstacle crossing frequency is less than or equal to the preset cleaning frequency; and acquiring a second obstacle crossing frequency corresponding to the second type of obstacle, crossing over or not crossing over the second type of obstacle based on the second obstacle crossing frequency, where the second obstacle crossing frequency is less than the preset cleaning frequency.

20 Claims, 4 Drawing Sheets

SELF-MOVING ROBOT, OBSTACLE CROSSING METHOD, OBSTACLE CROSSING SYSTEM AND COMPUTER-READABLE STORAGE MEDIUM

CROSS-REFERENCE TO RELATED APPLICATIONS

This application claims priority to Chinese Patent Application No. 202410291902.9, filed on Mar. 14, 2024, which is hereby incorporated by reference in its entirety.

TECHNICAL FIELD

The present disclosure relates to the technical field of walking of a self-moving robot and, in particular to, a self-moving robot, an obstacle crossing method, an obstacle crossing system and a computer-readable storage medium.

BACKGROUND

With the development of artificial intelligence technology, various self-moving robots with automatic moving functions, such as robot vacuum cleaner, have emerged. A robot vacuum cleaner is an automatic household appliance, which can replace manual cleaning on the floor. Generally, dust on the floor is first sucked into a dust box to clean the floor. In the process of working, a self-moving robot such as the robot vacuum cleaner usually uses a sensor to sense an obstacle ahead, and determines a corresponding obstacle avoidance strategy based on a type of the obstacle to complete a cleaning task with highest efficiency.

For example, when the sensor senses that there is an obstacle at a certain distance ahead, the self-moving robot will retreat and move over the obstacle in another direction for subsequent cleaning tasks. When the sensor senses that there is no obstacle ahead, the self-moving robot will move forward all the time and carry out a cleaning operation.

For another example, the robot vacuum cleaner has a certain obstacle avoidance ability. If a height of the obstacle is lower than a preset height, the robot vacuum cleaner can directly cross over the obstacle. For a target obstacle whose height is higher than the preset height, nowadays, the self-moving robot has developed an active obstacle crossing component, the self-moving robot can start the active obstacle crossing component at the obstacle, lift the robot vacuum cleaner and improve an obstacle crossing ability of the robot vacuum cleaner to cross over the target obstacle. For a structure of an active obstacle crossing component, please refer to the utility model patent application with the Application No. 202420153989.9.

Patent application CN111142526A discloses a method of determining a type of an obstacle and a corresponding obstacle crossing strategy, which, however, does not mention an obstacle crossing method for a self-moving robot with an active obstacle crossing component. It is time-consuming to start the active obstacle crossing component to cross over the target obstacle, which will reduce cleaning efficiency. During the crossing process, the robot vacuum cleaner will contact, collide and rub with the target obstacle, which will also cause damage to the robot vacuum cleaner and reduce its service life. For an area behind the target obstacle, the cleaning task is not necessarily urgent, and it is not necessary to clean the area every time. In general, there needs a comprehensive consideration on the frequency of the self-moving robot starts or does not start the active obstacle crossing component to cross over the obstacle.

Therefore, it is a problem that requires comprehensive consideration whether the self-moving robot with an active obstacle crossing component needs to start the active obstacle crossing component and whether it needs to clear a target area by crossing over the target obstacle, and an obstacle crossing method that can improve the cleaning efficiency and reduce the damage on the self-moving robot is needed.

SUMMARY

In view of the above, the present disclosure provides a self-moving robot, an obstacle crossing method, an obstacle crossing system and a computer-readable storage medium, which can reduce a number of times that the self-moving robot starts an active obstacle crossing component and a number of times that the self-moving robot crosses over the first type of obstacle and the second type of obstacle, improving the cleaning efficiency and prolonging the service life of the self-moving robot.

In a first aspect, the present disclosure provides an obstacle crossing method for a self-moving robot, where the self-moving robot includes an active obstacle crossing component and performs a cleaning task based on a preset cleaning frequency, and the obstacle crossing method includes: identifying a type of an obstacle, and determining whether the obstacle is a first type of obstacle or a second type of obstacle according to a height rule, where a height of the first type of obstacle is less than a first height, and a height of the second type of obstacle is greater than the first height and less than a second height; acquiring a first obstacle crossing frequency corresponding to the first type of obstacle, crossing over or not crossing over the first type of obstacle based on the first obstacle crossing frequency, and cleaning a first target area behind the first type of obstacle when crossing over the first type of obstacle; continuing to perform the cleaning task when not crossing over the first type of obstacle, where the first obstacle crossing frequency is less than or equal to the preset cleaning frequency; and acquiring a second obstacle crossing frequency corresponding to the second type of obstacle, crossing over or not crossing over the second type of obstacle based on the second obstacle crossing frequency, and cleaning a second target area behind the second type of obstacle when crossing over the second type of obstacle; continuing to perform the cleaning task when not crossing over the second type of obstacle, where the second obstacle crossing frequency is less than the preset cleaning frequency, so as to reduce a number of times that the self-moving robot starts the active obstacle crossing component and a number of times that the self-moving robot crosses over the second type of obstacle.

In some embodiments of the present disclosure, the first obstacle crossing frequency is a frequency at which the self-moving robot directly crosses over the first type of obstacle, and the second obstacle crossing frequency is a frequency at which the self-moving robot crosses over the second type of obstacle through the active obstacle crossing component, such that the self-moving robot executes different obstacle crossing strategies on the first type of obstacle and the second type of obstacle.

In some embodiments of the present disclosure, the first height is a maximum height of an obstacle that can be crossed over by the self-moving robot without starting the active obstacle crossing component, and the second height is a maximum height of an obstacle that can be crossed over by the self-moving robot when starting the active obstacle crossing component.

In some embodiments of the present disclosure, there are a plurality of first type of obstacles, each of the first type of obstacles has a corresponding first obstacle crossing frequency, and there are a plurality of second type of obstacles, each of the second type of obstacles has a corresponding second obstacle crossing frequency, so as to execute different obstacle crossing strategies for different obstacles.

In some embodiments of the present disclosure, the second obstacle crossing frequency is less than the first obstacle crossing frequency, so as to reduce a number of times that the self-moving robot crosses over the second type of obstacle and a number of times that the active obstacle crossing component is started.

In some embodiments of the present disclosure, the continuing to perform the cleaning task when not crossing over the first type of obstacle includes: adding a first virtual wall corresponding to the first type of obstacle in a cleaning map corresponding to the cleaning task; performing a first path planning based on the first virtual wall and a remaining cleaning task; not crossing over the first type of obstacle based on the first path planning, and completing the remaining cleaning task, to improve cleaning efficiency.

In some embodiments of the present disclosure, the continuing to perform the cleaning task when not crossing over the second type of obstacle includes: adding a second virtual wall corresponding to the second type of obstacle in a cleaning map corresponding to the cleaning task; performing a second path planning based on the second virtual wall and a remaining cleaning task; not crossing over the second type of obstacle based on the second path planning, and completing the remaining cleaning task, to improve cleaning efficiency.

In some embodiments of the present disclosure, where the cleaning the second target area behind the second type of obstacle when crossing over the second type of obstacle includes: when moving within a preset distance from the second type of obstacle, starting the active obstacle crossing component to raise a height of at least part of a bottom of the self-moving robot, such that the self-moving robot can cross over the second type of obstacle with a height greater than the first height and less than the second height, so as to improve obstacle crossing success rate.

In some embodiments of the present disclosure, the height of the first type of obstacle and the height of the second type of obstacle are determined by a structured light module in the self-moving robot by collecting point cloud data of the first type of obstacle and point cloud data of the second type of obstacle respectively, so as to improve accuracy of determined height of the first type of obstacle and height of the second type of obstacle.

In another aspect, the present disclosure further provides an obstacle crossing system of a self-moving robot, where the self-moving robot includes an active obstacle crossing component, and the obstacle crossing system includes: an identification module, configured to identify a type of an obstacle, and determine whether the obstacle is a first type of obstacle or a second type of obstacle according to a height rule, where a height of the first type of obstacle is less than a first height, and a height of the second type of obstacle is greater than the first height and less than a second height; a first obstacle crossing module, configured to acquire a first obstacle crossing frequency corresponding to the first type of obstacle, cross over or not cross over the first type of obstacle based on the first obstacle crossing frequency, and clean a first target area behind the first type of obstacle when crossing over the first type of obstacle; continue to perform a cleaning task when not crossing over the first type of obstacle, where the first obstacle crossing frequency is less than or equal to a preset cleaning frequency; and a second obstacle crossing module, configured to acquire a second obstacle crossing frequency corresponding to the second type of obstacle, cross over or not cross over the second type of obstacle based on the second obstacle crossing frequency, and clean a second target area behind the second type of obstacle when crossing over the second type of obstacle; continue to perform the cleaning task when not crossing over the second type of obstacle, where the second obstacle crossing frequency is less than the preset cleaning frequency, so as to reduce a number of times that the self-moving robot starts the active obstacle crossing component and a number of times that the self-moving robot crosses over the second type of obstacle; where the preset cleaning frequency is a frequency at which the self-moving robot performs the cleaning task.

In yet another aspect, the present disclosure provides a computer-readable storage medium, where the computer-readable storage medium stores a computer program which, when executed by a processor, causes the processor to implement the obstacle crossing method for a self-moving robot as described in any one of the above.

In yet still another aspect, the present disclosure provides a self-moving robot including a memory and a processor, where the memory stores a computer program, and the processor is arranged to execute, through the computer program, the obstacle crossing method for a self-moving robot as described in any one of the above.

Technical effects: the present disclosure provides a self-moving robot, an obstacle crossing method, an obstacle crossing system and a computer-readable storage medium. The self-moving robot includes an active obstacle crossing component, and performs cleaning tasks based on a preset cleaning frequency. The obstacle crossing method includes: identifying a type of an obstacle, and determining whether the obstacle is a first type of obstacle or a second type of obstacle according to a height rule, where a height of the first type of obstacle is less than a first height, and a height of the second type of obstacle is greater than the first height and less than a second height; acquiring a first obstacle crossing frequency corresponding to the first type of obstacle, crossing over or not crossing over the first type of obstacle based on the first obstacle crossing frequency, and cleaning a first target area behind the first type of obstacle when crossing over the first type of obstacle; continuing to perform the cleaning task when not crossing over the first type of obstacle, where the first obstacle crossing frequency is less than or equal to the preset cleaning frequency; acquiring a second obstacle crossing frequency corresponding to the second type of obstacle, crossing over or not crossing over the second type of obstacle based on the second obstacle crossing frequency, and cleaning a second target area behind the second type of obstacle when crossing over the second type of obstacle; continuing to perform the cleaning task when not crossing over the second type of obstacle, where the second obstacle crossing frequency is less than the preset cleaning frequency, so as to reduce a number of times that the self-moving robot starts the active obstacle crossing component and a number of times that the self-moving robot crosses over the second type of obstacle.

In the present disclosure, crossing over the obstacle and cleaning the target area are comprehensively considered, such that the times of crossing over the second type of obstacle is reduced, the times of starting the active obstacle crossing component is reduced, damage on the self-moving robot caused by crossing over the obstacle is reduced, and the service lives of the active obstacle crossing component and the self-moving robot are prolonged. Since the active obstacle crossing component consumes a certain time, the present disclosure also saves the cleaning time and improves cleaning efficiency.

Other features and aspects of the present disclosure will become apparent from the following detailed description of exemplary embodiments with reference to the accompanying drawings.

BRIEF DESCRIPTION OF DRAWINGS

The accompanying drawings, which are included in and constitute a part of the description, illustrate exemplary embodiments, features and aspects of the present disclosure together with the description and serve to explain the principles of the present disclosure.

DESCRIPTION OF EMBODIMENTS

Various exemplary embodiments, features and aspects of the present disclosure will be described in detail below with reference to the accompanying drawings. Same reference numbers in the accompanying drawings indicate elements with the same or similar functions. Although various aspects of the embodiments are shown in the accompanying drawings, the drawings are not necessarily drawn to scale unless otherwise specified.

The exclusive word "exemplary" here means "serving as an example, embodiment or illustration". Any embodiment described herein as "exemplary" is not necessarily to be construed as being superior or better than other embodiments.

The same or similar reference numbers in the accompanying drawings of this embodiment correspond to the same or similar parts. In the description of the present disclosure, it should be understood that an azimuth or positional relationship indicated by terms such as "upper", "lower", "left", "right", "inner" and "outer" is based on the azimuth or positional relationship shown in the accompanying drawings, and is only for the convenience of describing the present disclosure and simplifying the description, and does not indicate or imply that an apparatus or an element referred to have a specific orientation, and be constructed and operated in a specific orientation. Therefore, terms describing the positional relationship in the accompanying drawings are only used for illustrative purposes, and cannot be understood as limitations of the present disclosure. For those of ordinary skill in the art, specific meanings of the above terms can be understood according to specific conditions.

It should be noted that in the present disclosure, terms "including", "containing" or any other variation thereof are intended to cover non-exclusive inclusion, such that a process, an article or an apparatus including a series of elements includes not only those elements, but also other elements not explicitly listed, or elements inherent to such process, article or apparatus. Without more restrictions, an element defined by a phrase "including one" does not exclude the existence of other identical elements in the process, article or device including the element.

It should be noted that terms "first" and "second" in the description, the claims and the accompanying drawings of the present disclosure are used to distinguish similar objects, and are not necessarily used to describe a specific order or sequence.

In addition, in order to better explain the present disclosure, numerous specific details are given in the following implementation. It should be understood by those skilled in the art that the present disclosure may be practiced without certain specific details. In some instances, methods, means, elements and circuits that are well known to those skilled in the art have not been described in detail, to highlight the theme of the present disclosure.

Figure 1:
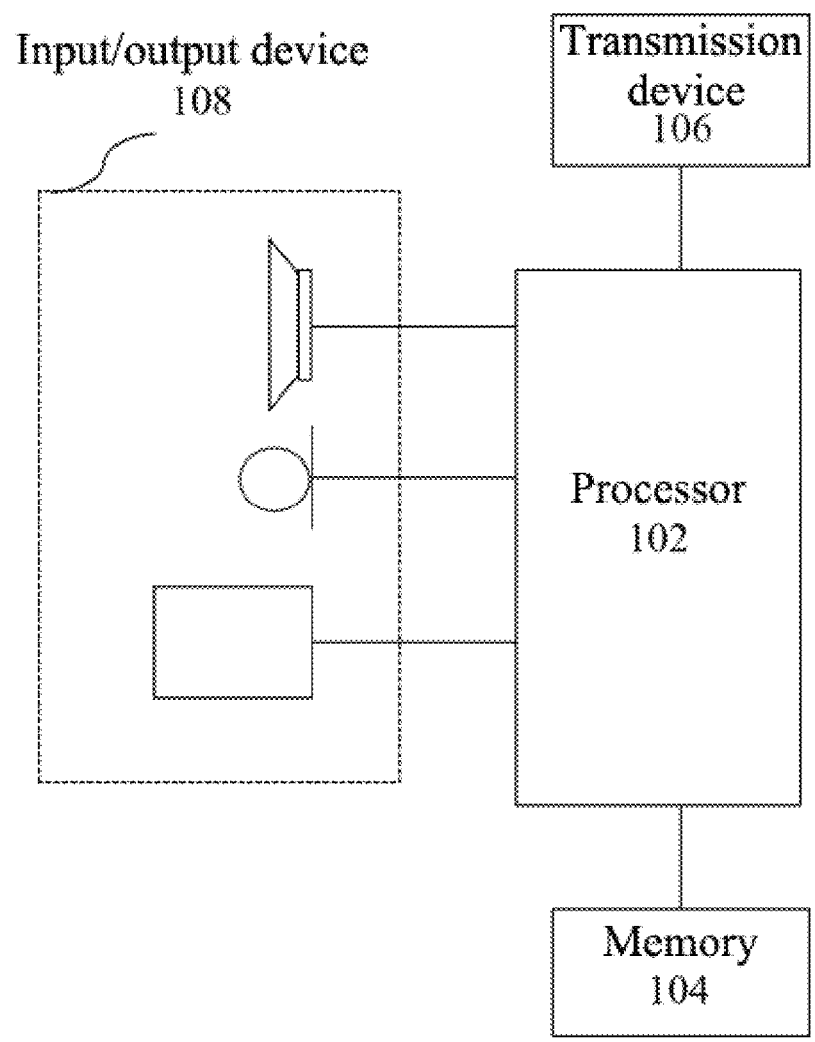
FIG. 1 is a hardware structural block diagram of a computer terminal of an obstacle crossing method for a self-moving robot provided by an embodiment of the present disclosure.

Method embodiments provided by embodiments of the present disclosure can be executed in a computer terminal or a similar computing apparatus. Taking running on the computer terminal as an example, FIG. 1 is a hardware structural block diagram of a computer terminal of an obstacle crossing method for a self-moving robot provided by an embodiment of the present disclosure. As shown in FIG. 1, a computer terminal may include a processing apparatus such as one or more (only one is shown in FIG. 1) processors 102 (the processor 102 may include, but are not limited to, a microprocessor unit (MPU) or a programmable logic device (PLD)) and a memory 104 for storing data. In an implementation, the computer terminal may also include a transmission device 106 for communication function and an input/output device 108. It can be understood by those skilled in the art that the structure shown in FIG. 1 is only schematic, which does not limit the structure of the above-mentioned computer terminal. For example, the computer terminal may also include more or fewer components than those shown in FIG. 1, or have a different configuration with equivalent functions as those shown in FIG. 1 or with more functions than those shown in FIG. 1.

The memory 104 can be used to store a computer program, for example, a software program and modules of application software, such as a computer program corresponding to the obstacle crossing method in the embodiment of the present disclosure. By running the computer program stored in the memory 104, the processor 102 executes various functional applications and data processing, that is, implements the above method. The memory 104 may include a high-speed random access memory, and may also include a non-volatile memory, such as one or more magnetic storage apparatuses, flash memories, or other non-volatile solid-state memories. In some examples, the memory 104 may further include memories remotely located with respect to the processor 102, and these remote memories may be connected to a computer terminal through a network. Examples of the above networks include, but are not limited to, the Internet, an intranet of an enterprise, a local area network, a mobile communication network, and combinations thereof.

The transmission device 106 is used to receive or transmit data via a network. Specific examples of the above-mentioned networks may include a wireless network provided by a communication provider of the computer terminal. In one example, the transmission device 106 includes a network interface controller (NIC), which can be connected with other network devices through a base station so as to communicate with the Internet. In one example, the transmission device 106 may be a radio frequency (RF) module, which is used to communicate with the Internet in a wireless manner.

In the process of performing a cleaning task in a preset area, the self-moving robot can traverse the area to be cleaned along its travel path, so as to improve the cleaning effect and not miss the area to be cleaned. For example, the self-moving robot will clean a room with a cleaning path of a zigzag line.

The self-moving robot can clean the preset area based on a preset cleaning frequency. The preset cleaning frequency f is a cleaning frequency of the self-moving robot to the preset area, and a user can set a cleaning times P to the preset area within a certain task period T for the self-moving robot, and the preset cleaning frequency f equals the cleaning times P/the task period T. For example, if the task period T is one day and the self-moving robot cleans the preset area once a day, the preset cleaning frequency f is 1. For another example, if the task period T is 2 days and the self-moving robot cleans the preset area once every 2 days, the preset cleaning frequency f is 0.5.

The preset cleaning frequency can be pre-determined by the user before a cleaning, can also be adjusted by the self-moving robot based on the actual situation during the cleaning, and can also be re-set by the user after one cleaning is finished and before a beginning of a next cleaning, where the preset cleaning frequencies corresponding to different preset areas can be the same or different. The user can determine the preset cleaning frequency in advance based on personal preference and actual situation. The user can determine the preset cleaning frequency based on how easy for the preset are to get dirty. The easier for the preset area to get dirty, the higher the preset cleaning frequency. The user can also determine the preset cleaning frequency based on whether the user often arrives at the preset area, and the higher the frequency of the user arriving at the preset area, the higher the preset cleaning frequency.

During the cleaning process, there may be obstacles on the travel path of the self-moving robot, and in order to complete the cleaning task, the self-moving robot may need to cross over the obstacles to complete the remaining cleaning task. In view of this situation, the application provides an obstacle crossing method for a self-moving robot, which can be executed by the self-moving robot.

The self-moving robot has an active obstacle crossing component, and the active obstacle crossing component can improve an obstacle crossing ability of the self-moving robot. Under a condition of starting the active obstacle crossing component, the self-moving robot itself has a certain obstacle crossing ability, and can cross obstacles with a certain height, such as obstacles with a height not exceeding 2 cm, 2.5 cm or 3 cm. Under a condition of starting the active obstacle crossing component, the self-moving robot can be lifted integrally by the active obstacle crossing component, such that the self-moving robot can cross over obstacles with higher heights, for example, the self-moving robot can cross over obstacles with heights not exceeding 3.5 cm, 4 cm or 5 cm, and the active obstacle crossing component improves the obstacle crossing capability of the self-moving robot.

Figure 2:
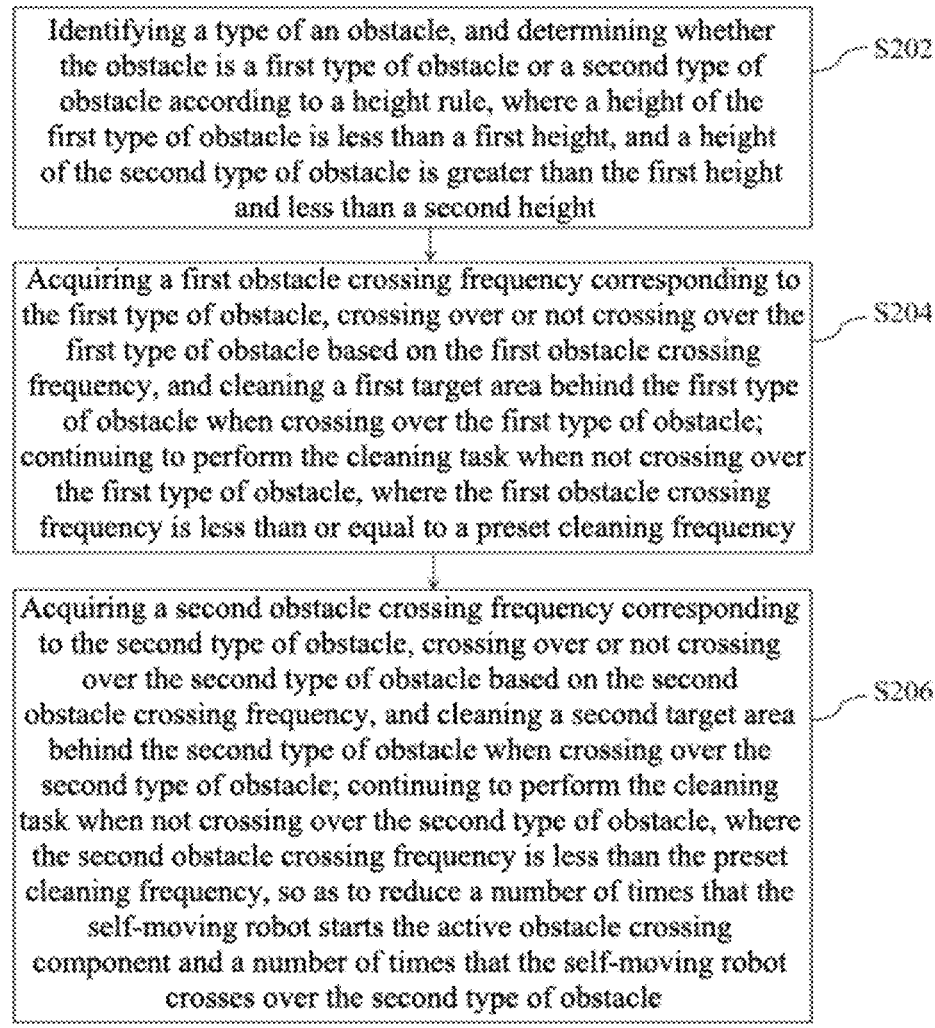
FIG. 2 is a flowchart of an obstacle crossing method for a self-moving robot provided by an embodiment of the present disclosure.

FIG. 2 is a flowchart of an obstacle crossing method for a self-moving robot provided by an embodiment of the present disclosure. The obstacle crossing method can be executed by the self-moving robot. As shown in FIG. 2, in this embodiment, the obstacle crossing method may include steps S202-S206.

S202, identifying a type of an obstacle, and determining whether the obstacle is a first type of obstacle or a second type of obstacle according to a height rule, where a height of the first type of obstacle is less than a first height, and a height of the second type of obstacle is greater than the first height and less than a second height.

In an implementation, when the active obstacle crossing component is not started, the maximum height of an obstacle that the self-moving robot can cross over is the first height. When the active obstacle crossing component is started, the maximum height of the obstacle that the self-moving robot can cross over is the second height. The second height is greater than the first height.

Specifically, since the height of the first type of obstacle is less than the first height, the first type of obstacle can be an obstacle that the self-moving robot can cross over without starting the active obstacle crossing component. Since the height of the second type of obstacle is greater than the first height and less than the second height, the second type of obstacle can be an obstacle that the self-moving robot can cross over when starting the active obstacle crossing component.

In some embodiments, there could be one or more first types of obstacles, and the heights of different first types of obstacles may be the same or different. There could be one or more second types of obstacles, and the heights of different second types of obstacles may be the same or different.

In an implementation, the height of the first type of obstacle and the height of the second type of obstacle are determined by a structured light module in the self-moving robot by collecting point cloud data of the first type of obstacle and point cloud data of the second type of obstacle respectively, so as to improve accuracy of determined height of the first type of obstacle and height of the second type of obstacle.

Specifically, after collecting information of the obstacles on the travel path of the self-moving robot to obtain an environmental image, the structured light module can perform various processing on the environmental image to extract point cloud data of the obstacle. The self-moving robot can determine the height of the obstacle based on the point cloud data of the obstacle. In some embodiments, the obstacle is a step-shaped obstacle with a certain height. The step-shaped obstacle may include, but are not limited to, steps, protrusion obstacles, and the like.

In some embodiments, the structured light module includes a camera module and a line laser emitter. During the process of traveling, the self-moving robot can control the line laser emitter to emit a line laser, and the line laser will be reflected back when encountering an object in the front area. At the same time, the self-moving robot can collect environmental images in the front area through the camera module. During this period, if the line laser detects that there is an obstacle in the front area, a laser line segment will be formed on the surface of the obstacle, and the laser line segment can be collected by the camera module. That is, the environmental image collected by the camera module contains the laser line segment formed after the line laser emitted by the line laser emitter encounters an object.

A large number of pixels on the laser line segment in the environmental image can form the point cloud data of the obstacle (point cloud data of the first type of obstacle and point cloud data of the second type of obstacle) corresponding to the topography. The self-moving robot may further determine the height of the obstacle based on the point cloud data of the obstacle. The method for determining the height of the obstacle based on the point cloud data of the obstacle is not limited in the present disclosure. For example, the self-moving robot can input the point cloud data into a deep learning model to determine the height of the obstacle.

After determining the height of the obstacle, the self-moving robot can determine whether the obstacle is the first type of obstacle or the second type of obstacle based on the height rule. The height rule may be that when the height of the obstacle is less than the first height, the self-moving robot determines that the obstacle is the first type of obstacle; and when the height of the obstacle is greater than the first height and less than the second height, the self-moving robot determines that the obstacle is the second type of obstacle.

In some embodiments, the height rule may also be that when the height of the obstacle is greater than the second height, the self-moving robot determines that the obstacle is a third type of obstacle. The self-moving robot cannot cross over the third type of obstacle even if the active obstacle crossing component is started. The self-moving robot can bypass or avoid the third type of obstacle to complete the remaining cleaning task.

S204: acquiring a first obstacle crossing frequency corresponding to the first type of obstacle, crossing over or not crossing over the first type of obstacle based on the first obstacle crossing frequency, and cleaning a first target area behind the first type of obstacle when crossing over the first type of obstacle; continuing to perform the cleaning task when not crossing over the first type of obstacle, where the first obstacle crossing frequency is less than or equal to a preset cleaning frequency.

S206: acquiring a second obstacle crossing frequency corresponding to the second type of obstacle, crossing over or not crossing over the second type of obstacle based on the second obstacle crossing frequency, and cleaning a second target area behind the second type of obstacle when crossing over the second type of obstacle; continuing to perform the cleaning task when not crossing over the second type of obstacle, where the second obstacle crossing frequency is less than the preset cleaning frequency, so as to reduce a number of times that the self-moving robot starts the active obstacle crossing component and a number of times that the self-moving robot crosses over the second type of obstacle.

The self-moving robot may encounter an obstacle (the first type of obstacle or the second type of obstacle) when performing the cleaning task, and it needs to cross over the obstacle to clean the target area behind the obstacle (the first target area or the second target area). However, when crossing over the obstacle, the self-moving robot will contact, collide and rub with the obstacle, and the process of crossing over the obstacle will cause certain damage to the self-moving robot, which will reduce its service life.

On the other hand, when crossing over the second type of obstacle, the self-moving robot needs to start the active obstacle crossing component, yet it takes a certain time to start the active obstacle crossing component, which will prolong the cleaning time, cause damage to the active obstacle crossing component and reduce the service life of the active obstacle crossing component. However, the cleaning of the target area does not need to be carried out in every task cycle, therefore, the obstacle crossing strategy can be optimized, such that the self-moving robot will not cross over the obstacle and not clean the target area when encountering the obstacle for a certain time. When the obstacle is encountered for another time, the obstacle is crossed over and the target area is cleaned, such that the number of times of obstacle crossing of the self-moving robot and the times of starting the active obstacle crossing component are reduced integrally, the service life of the self-moving robot and the active obstacle crossing component is prolonged, while taking the cleaning of the target area into account.

In an implementation, the first obstacle crossing frequency is a frequency at which the self-moving robot directly crosses over the first type of obstacle, and the second obstacle crossing frequency is a frequency at which the self-moving robot crosses over the second type of obstacle through the active obstacle crossing component, such that the self-moving robot can execute different obstacle crossing strategies on the first type of obstacle and the second type of obstacle.

The crossing over the first type of obstacle directly can be understood as that the self-moving robot does not start the active obstacle crossing component, but directly advances through driving power of its own driving wheel to cross over the first type of obstacle.

In some embodiments, the first obstacle crossing frequency f1 is a number of times P1 that the self-moving robot crosses over the first type of obstacle in a certain task period T1, and the first obstacle crossing frequency f1 is a ration of the number of times P1 to the task period T1. If the task period T1 is one day and the number of times that the self-moving robot crosses over the first type of obstacle is once every day, the first obstacle crossing frequency f1 is 1. If the task period T1 is three days and the number of times that the self-moving robot crosses over the first type of obstacle is once every three days, the first obstacle crossing frequency f1 is ⅓.

In other embodiments, the first obstacle crossing frequency is a ratio of a number of times the self-moving robot crosses over the first type of obstacle to the total number of times it encounters the first type of obstacle. Encountering the first type of obstacle can be understood as the self-moving robot encountering the first type of obstacle on the travel path during the execution of the cleaning task.

If the self-moving robot crosses over the first type of obstacle once in every two times that it encounters the first type of obstacle, the first obstacle crossing frequency is ½. If the self-moving robot crosses over the first type of obstacle once in every three times it encounters the first type of obstacle, the first obstacle crossing frequency is ⅓.

In some embodiments, the second obstacle crossing frequency f2 is the number of times P2 that the self-moving robot crosses over the second type of obstacle within a certain task period T2. If the task period T2 is one day and the number of times that the self-moving robot crosses over the second type of obstacle is once every day, the second obstacle crossing frequency f2 is 1. If the task period T2 is three days and the number of times that the self-moving robot crosses over the second type of obstacle is once every three days, the second obstacle crossing frequency is ⅓.

In other embodiments, the second obstacle crossing frequency is a ratio of the number of times that the self-moving robot crosses over the second type of obstacle to the total number of times it encounters the second type of obstacle. Encountering the second type of obstacle can be understood as the self-moving robot encountering the second type of obstacle on the travel path during the execution of a cleaning task.

If the self-moving robot crosses over the second type of obstacle once in every two time it encounters the second type of obstacle, the second obstacle crossing frequency is ½. If the self-moving robot crosses over the second obstacle once in every three times it encounters the second type of obstacle, the second obstacle crossing frequency is ⅓.

The first obstacle crossing frequency or the second obstacle crossing frequency can be preset by the user in the self-moving robot, or can be dynamically adjusted based on the actual situation.

In some embodiments, the first obstacle crossing frequency is less than or equal to the preset cleaning frequency, and the self-moving robot may cross over or not cross over the first type of obstacle based on the first obstacle crossing frequency. When crossing over the first type of obstacle, the self-moving robot can clean the first target area behind the first type of obstacle.

When not crossing the first type of obstacle, the self-moving robot continues to perform the cleaning task.

For example, the first obstacle crossing frequency is ⅓, and if the last time that the self-moving robot crossed over the first type of obstacle is two days ago, the self-moving robot will not cross over the first type of obstacle this time and will continue to perform the cleaning task by bypassing the first type of obstacle. If the last time that the self-moving robot crossed over the first type of obstacle is three days ago, the self-moving robot crosses over the first type of obstacle this time and cleans the first target area.

For another example, the first obstacle crossing frequency is ⅓, and since the self-moving robot crossed over the first type of obstacle last time, the number of times that the self-moving robot encountered the first type of obstacle is 2, the self-moving robot does not cross the first type of obstacle this time, and continues to perform the cleaning task by bypassing the first type of obstacle. After the self-moving robot crossed over the first type of obstacle last time, the number of times that the self-moving robot encounters the first type of obstacle is 3 (including this time), then the self-moving robot crosses over the first type of obstacle this time and cleans the first target area.

Technical effects: through crossing over the first type of obstacle based on the first obstacle crossing frequency, the self-moving robot could clean the first target area behind the first type of obstacle. And when the first obstacle crossing frequency is less than the preset cleaning frequency, the number of times that the self-moving robot crosses over the first type of obstacles can be reduced, the damage generated by the self-moving robot in the process of crossing over the first type of obstacle is reduced, and the service life of the self-moving robot is prolonged.

In some embodiments, the second obstacle crossing frequency is less than the preset cleaning frequency, and the self-moving robot may cross over or not cross over the second type of obstacle based on the second obstacle crossing frequency. When crossing over the second type of obstacle, the self-moving robot can clean the second target area behind the second type of obstacle. When not crossing the second type of obstacle, the self-moving robot can continue to perform the cleaning task. When crossing over the second type of obstacle, the self-moving robot needs to start the active obstacle crossing component, and the second obstacle crossing frequency is less than the preset cleaning frequency, thus, the number of times the self-moving robot starts the active obstacle crossing component and the number of times the self-moving robot crosses over the second type of obstacle can be reduced.

For example, the second obstacle crossing frequency is ¼, and if the last time the self-moving robot crossed over the second type of obstacle is three days ago, the self-moving robot will not cross the second type of obstacle this time and will continue to perform the cleaning task by bypassing the second type of obstacle. If the last time the self-moving robot crossed over the second type of obstacle is four days ago, the self-moving robot crosses over the second type of obstacle this time and cleans the second target area.

For another example, the second obstacle crossing frequency is ¼, and after the self-moving robot crossed over the second type of obstacle last time, the number of times that the self-moving robot encounters the second type of obstacle is 3, then the self-moving robot will not cross over the second type of obstacle this time and will continue to perform the cleaning task by bypassing the second type of obstacle. After the self-moving robot crossed over the second type of obstacle last time, the number of times that the self-moving robot encountered the second type of obstacle is 4 (including this time), then the self-moving robot crosses over the second type of obstacle and cleans the second target area this time.

Technical effects: through crossing over the second type of obstacle based on the second obstacle crossing frequency, the second target area behind the second type of obstacle is cleaned, and the second obstacle crossing frequency is less than the preset cleaning frequency, such that the number of times the self-moving robot crosses over the second type of obstacle can be reduced, the damage on the self-moving robot caused in the process of crossing over the second type of obstacle is reduced, and the service life of the self-moving robot is prolonged. At the same time, it also reduces the number of times that the self-moving robot starts the active obstacle crossing component. Since it takes a certain time to start the active obstacle crossing component to cross over the second type of obstacle, this method saves cleaning time and improves cleaning efficiency.

The first target area and the second target area do not need to be cleaned every time, and through compromise consideration, the self-moving robot does not need to cross over the first type of obstacle or the second type of obstacle to clean the first target area or the second target area every time it performs a cleaning task. The number of times that the self-moving robot crosses over the first type of obstacle (when the first obstacle crossing frequency is less than the preset cleaning frequency) or the second type of obstacle is reduced, the obstacle crossing damage on the self-moving robot is reduced, the times of starting the active obstacle crossing component are reduced, and the service life of the self-moving robot and the active obstacle crossing component is prolonged. Considering that the obstacle crossing process takes a certain time, this method also saves the cleaning time, optimizes the cleaning efficiency, while taking the cleaning of the first target area and the second target area into account.

In an implementation, the cleaning the second target area behind the second type of obstacle when crossing over the second type of obstacle includes: when moving within a preset distance from the second type of obstacle, the self-moving robot starts the active obstacle crossing component to raise a height of at least part of a bottom of the self-moving robot, such that the self-moving robot can cross over the second type of obstacle with a height greater than the first height and less than the second height, so as to improve obstacle crossing success rate In some embodiments, the active obstacle crossing component lifts the height of at least part of the bottom of the self-moving robot, such that the height of the at least part of the bottom reaches a certain proportion of the height of the second type of obstacles. The certain proportion can be 70%, 80%, 90%, 100%, and so on.

In some embodiments, the preset distance range may be determined based on the height of the obstacle and/or the lifting height by the active obstacle crossing component to at least part of the bottom of the self-moving robot. The preset distance range can be preset by the system, or set by the user in the self-moving robot in advance, or determined by the self-moving robot in real time after the height of the obstacle is determined.

By starting the active obstacle crossing component to raise the height of at least part of the bottom of the self-moving robot when the self-moving robot moves within a preset distance from the second type of obstacle, the success rate of the self-moving robot crossing over the second type of obstacle can be improved.

In an implementation, there are a plurality of first types of obstacles, each of the first types of obstacles has a corresponding first obstacle crossing frequency, and there are a plurality of second types of obstacles, each of the second types of obstacles has a corresponding second obstacle crossing frequency, such that the self-moving robot can execute different obstacle crossing strategies for different obstacles, and the obstacle crossing flexibility of the self-moving robot is improved.

In some embodiments, the self-moving robot determines the corresponding first obstacle crossing frequency based on the height of each of the first types of obstacles. Considering that the higher the height, the more difficult it is for the obstacle to be crossed over. The higher the height of the first type of obstacle, the lower the corresponding first obstacle crossing frequency. The self-moving robot determines the corresponding second obstacle crossing frequency based on the height of each of the second types of obstacles. Considering that the higher the height, the more difficult it is for the obstacle to be crossed over, the higher the height of the second type of obstacle, the lower the corresponding second obstacle crossing frequency.

In some embodiments, the user can set cleaning importance of the first target area or cleaning importance of the second target area in advance in the self-moving robot, and set a corresponding first weight and a corresponding second weight for the first type of obstacle and the second type of obstacles respectively based on the importance. The higher the importance, the higher the corresponding weight. The self-moving robot may determine the first obstacle crossing frequency and the second obstacle crossing frequency based on the first weight and the second weight, respectively.

In other embodiments, the self-moving robot can, based on the height of the obstacle and the cleaning importance of the target area corresponding to the obstacle, determine the frequency corresponding to the obstacle, that is, the first obstacle crossing frequency corresponding to the first type of obstacle or the second obstacle crossing frequency corresponding to the second type of obstacle.

In an implementation, the second obstacle crossing frequency is less than the first obstacle crossing frequency, so as to reduce the number of times that the self-moving robot crosses over the second type of obstacle and the number of times that the active obstacle crossing component is started.

The height of the second type of obstacle is higher than the height of the first type of obstacle, and considering that the higher the height is, the more difficult it is for the obstacle to be crossed over, the second obstacle crossing frequency can be lower than the first obstacle crossing frequency, therefore, the self-moving robot can execute different obstacle crossing strategies for the first type of obstacle and the second type of obstacle, such that the obstacle crossing flexibility is improved, the times of crossing over the second type of obstacle are reduced integrally, and the times of starting the active obstacle crossing component and crossing the second type of obstacles by the self-moving robot are reduced, thereby saving cleaning time and reducing the damage on the self-moving robot caused by obstacle crossing action.

Figure 3:
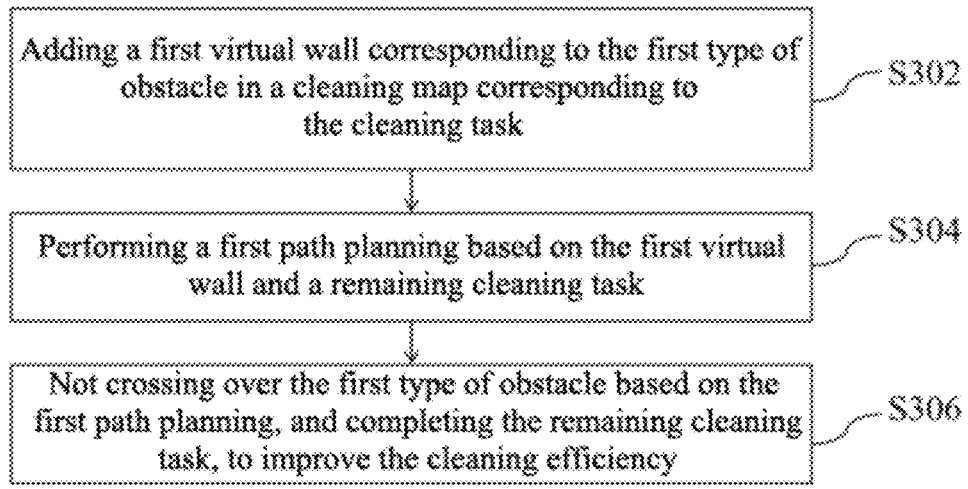
FIG. 3 is a flowchart of yet another obstacle crossing method for a self-moving robot provided by an embodiment of the present disclosure.

FIG. 3 is a flowchart of yet another obstacle crossing method for a self-moving robot provided by an embodiment of the present disclosure. The obstacle crossing method can be executed by the self-moving robot. As shown in FIG. 3, in this embodiment, the obstacle crossing method may include steps S302, S304 and S306:

S302: adding a first virtual wall corresponding to the first type of obstacle in a cleaning map corresponding to the cleaning task;

304: performing a first path planning based on the first virtual wall and a remaining cleaning task; and 306: not crossing over the first type of obstacle based on the first path planning, and completing the remaining cleaning task, to improve cleaning efficiency.

When the self-moving robot does not cross the first type of obstacle, it will bypass the first type of obstacle, and will not clean the first target area behind the first type of obstacle this time, and will clean the first target area when it crosses over the first type of obstacle next time.

In some embodiments, in order to bypass the first type of obstacle, the self-moving robot can determine the first virtual wall corresponding to the first type of obstacle and add the first virtual wall to the cleaning map corresponding to the cleaning task.

The virtual wall is a hypothetical wall set for the self-moving robot, which does not actually exist, but can be recognized by the self-moving robot. For the self-moving robot, the virtual wall is an obstacle that cannot be passed through. Once the virtual wall is recognized, avoidance is required for the self-moving robot.

In some embodiments, the self-moving robot can perform a first path planning based on the first virtual wall and the remaining cleaning task, and complete the remaining cleaning task based on a result of the first path planning. It can be understood that the result of the first path planning is an optimal route for the self-moving robot to complete the remaining cleaning task without crossing over the first type of obstacle. The self-moving robot avoids the first type of obstacle based on the result of the first path planning, that is, the self-moving robot does not cross over the first type of obstacle and complete the remaining cleaning task, thereby improving the cleaning efficiency.

By adding the virtual wall to the cleaning map and performing the first path planning based on the virtual wall and the remaining cleaning task, the self-moving robot can be prevented from repeatedly crossing over the first type of obstacle in the process of completing the remaining cleaning task, and the times of crossing the first type of obstacle can be optimized or reduced, missing of an area to be cleaned and re-cleaning can be avoided, thereby improving the cleaning efficiency.

Figure 4:
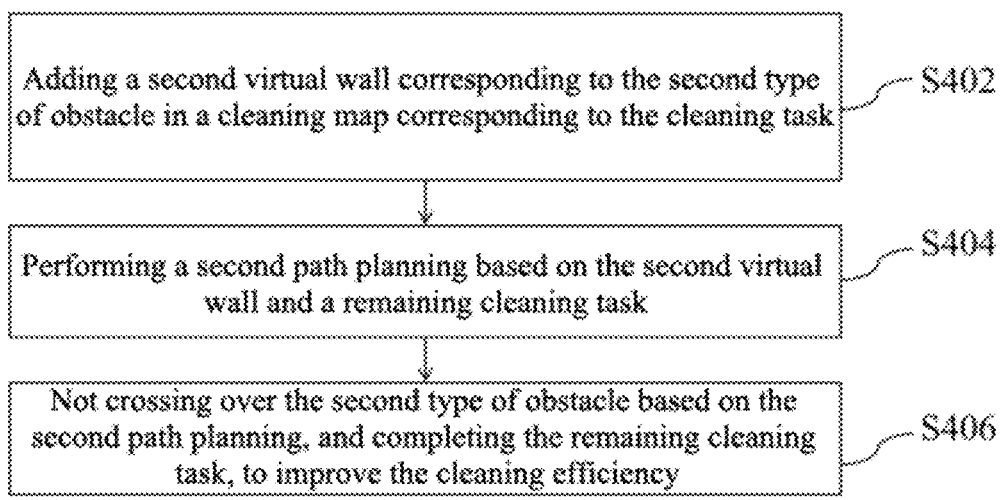
FIG. 4 is a flowchart of yet another obstacle crossing method for a self-moving robot provided by an embodiment of the present disclosure.

FIG. 4 is a flowchart of yet another obstacle crossing method for a self-moving robot provided by an embodiment of the present disclosure. The obstacle crossing method can be executed by the self-moving robot. As shown in FIG. 4, in this embodiment, the obstacle crossing method may include steps S402, S404 and S406:

S402: adding a second virtual wall corresponding to the second type of obstacle in a cleaning map corresponding to the cleaning task;

S404: performing a second path planning based on the second virtual wall and a remaining cleaning task; and S406: not crossing over the second type of obstacle based on the second path planning, and completing the remaining cleaning task, to improve the cleaning efficiency.

When the self-moving robot does not cross over the second type of obstacle, it will bypass the second type of obstacle, and will not clean the second target area behind the second type of obstacle this time, and will clean the second target area when it crosses over the second type of obstacle next time. Since the self-moving robot does not crossing over the second type of obstacle, the self-moving robot does not need to start the active obstacle crossing component, thereby reducing the usage frequency of the active obstacle crossing component and the usage damage of the active obstacle crossing component, and prolonging the service life of the active obstacle crossing component.

In some embodiments, in order to bypass the second type of obstacle, the self-moving robot can determine the second virtual wall corresponding to the second type of obstacle and add the second virtual wall to the cleaning map corresponding to the cleaning task.

The virtual wall is a hypothetical wall set for the self-moving robot, which does not actually exist, but can be recognized by the self-moving robot. For the self-moving robot, the virtual wall is an obstacle that cannot be passed through. Once the virtual wall is recognized, avoidance is required for the self-moving robot.

In some embodiments, the self-moving robot can perform a second path planning based on the second virtual wall and the remaining cleaning task, and complete the remaining cleaning task based on a result of the second path planning. It can be understood that the result of the second path planning is an optimal route for the self-moving robot to complete the remaining cleaning task without crossing over the second type of obstacle. The self-moving robot bypasses the second type of obstacle based on the result of the second path planning, that is, the self-moving robot does not cross over the second type of obstacle and complete the remaining cleaning task, thereby improving the cleaning efficiency. At the same time, the times of starting the active obstacle crossing component are reduced, and the cleaning time is saved.

By adding the virtual wall to the cleaning map and performing the second path planning based on the virtual wall and the remaining cleaning task, the self-moving robot can be prevented from repeatedly crossing over the obstacle (including the second type of obstacle) in the process of completing the remaining cleaning task, the times of crossing over the obstacle and the times of starting the active obstacle crossing component are reduced, and missing of an area to be cleaned and re-cleaning are avoided, thereby improving the cleaning efficiency.

Figure 5:
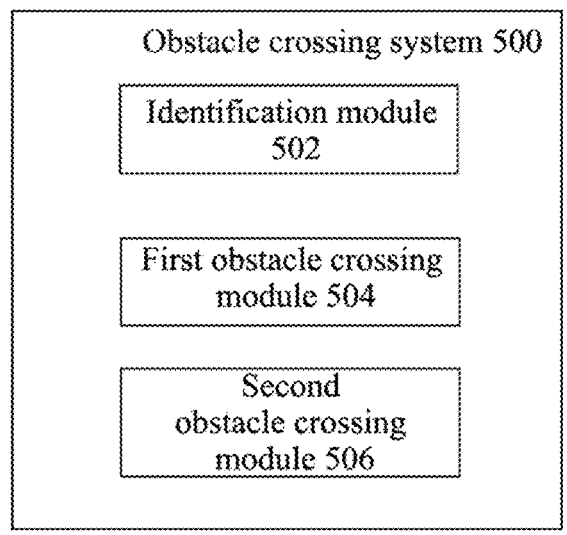
FIG. 5 is a schematic structural diagram of an obstacle crossing system of a self-moving robot provided by an embodiment of the present disclosure.

FIG. 5 is a schematic structural diagram of an obstacle crossing system of a self-moving robot provided by an embodiment of the present disclosure. As shown in FIG. 5, the obstacle crossing system 500 includes an identification module 502, a first obstacle crossing module 504, and a second obstacle crossing module 506.

The identification module 502 is configured to identify a type of an obstacle, and determine whether the obstacle is a first type of obstacle or a second type of obstacle according to a height rule, where a height of the first type of obstacle is less than a first height, and a height of the second type of obstacle is greater than the first height and less than a second height.

In an implementation, when the active obstacle crossing component is not started, the maximum height of an obstacle that the self-moving robot can cross over is the first height. When the active obstacle crossing component is started, the maximum height of the obstacle that the self-moving robot can cross over is the second height. The second height is greater than the first height.

Specifically, since the height of the first type of obstacle is less than the first height, the first type of obstacle can be an obstacle that the self-moving robot can cross over without starting the active obstacle crossing component. Since the height of the second type of obstacle is greater than the first height and less than the second height, the second type of obstacle can be an obstacle that the self-moving robot can cross over when starting the active obstacle crossing component.

The first obstacle crossing module 504 is configured to acquire a first obstacle crossing frequency corresponding to the first type of obstacle, cross over or not cross over the first type of obstacle based on the first obstacle crossing frequency, and clean a first target area behind the first type of obstacle when crossing over the first type of obstacle; continue to perform a cleaning task when not crossing over the first type of obstacle, where the first obstacle crossing frequency is less than or equal to a preset cleaning frequency.

The second obstacle crossing module 506 is configured to acquire a second obstacle crossing frequency corresponding to the second type of obstacle, cross over or not cross over the second type of obstacle based on the second obstacle crossing frequency, and clean a second target area behind the second type of obstacle when crossing over the second type of obstacle; continue to perform the cleaning task when not crossing over the second type of obstacle, where the second obstacle crossing frequency is less than the preset cleaning frequency, so as to reduce a number of times that the self-moving robot starts the active obstacle crossing component and a number of times that the self-moving robot crosses over the second type of obstacle; where the preset cleaning frequency is a frequency at which the self-moving robot performs the cleaning task.

In an implementation, the first obstacle crossing frequency is a frequency at which the self-moving robot directly crosses over the first type of obstacles, and the second obstacle crossing frequency is a frequency at which the self-moving robot crosses over the second type of obstacle through the active obstacle crossing component, such that the self-moving robot can execute different obstacle crossing strategies on the first type of obstacle and the second type of obstacle.

The crossing over the first type of obstacle directly can be understood as that the self-moving robot does not start the active obstacle crossing component, but directly advances through driving power of its own driving wheel to cross over the first type of obstacle.

In some embodiments, the first obstacle crossing frequency $f1$ is a number of times P1 that the self-moving robot crosses over the first type of obstacle in a certain task period T1, and the first obstacle crossing frequency $f1$ is a ration of the number of times P1 to the task period T1. If the task period T1 is one day and the number of times that the self-moving robot crosses over the first type of obstacle is once every day, the first obstacle crossing frequency $f1$ is 1.

If the task period T1 is three days and the number of times that the self-moving robot crosses over the first type of obstacle is once every three days, the first obstacle crossing frequency f1 is ⅓.

In other embodiments, the first obstacle crossing frequency is a ratio of a number of times the self-moving robot crosses over the first type of obstacle to the total number of times it encounters the first type of obstacle. Encountering the first type of obstacle can be understood as the self-moving robot encountering the first type of obstacle on the travel path during the execution of the cleaning task.

If the self-moving robot crosses over the first type of obstacle once in every two times that it encounters the first type of obstacle, the first obstacle crossing frequency is ½. If the self-moving robot crosses over the first type of obstacle once in every three times it encounters the first type of obstacle, the first obstacle crossing frequency is ⅓.

In some embodiments, the second obstacle crossing frequency f2 is the number of times P2 that the self-moving robot crosses over the second type of obstacle within a certain task period T2. If the task period T2 is one day and the number of times that the self-moving robot crosses over the second type of obstacle is once every day, the second obstacle crossing frequency f2 is 1. If the task period T2 is three days and the number of times that the self-moving robot crosses over the second type of obstacle is once every three days, the second obstacle crossing frequency is ⅓.

In other embodiments, the second obstacle crossing frequency is a ratio of the number of times that the self-moving robot crosses over the second type of obstacle to the total number of times it encounters the second type of obstacle. Encountering the second type of obstacle can be understood as the self-moving robot encountering the second type of obstacle on the travel path during the execution of a cleaning task.

If the self-moving robot crosses over the second type of obstacle once in every two time it encounters the second type of obstacle, the second obstacle crossing frequency is ½. If the self-moving robot crosses over the second obstacle once in every three times it encounters the second type of obstacle, the second obstacle crossing frequency is ⅓.

The first obstacle crossing frequency or the second obstacle crossing frequency can be preset by the user in the self-moving robot, or can be dynamically adjusted based on the actual situation.

Technical effects: through crossing over the first type of obstacle based on the first obstacle crossing frequency, the self-moving robot could clean the first target area behind the first type of obstacle. And when the first obstacle crossing frequency is less than the preset cleaning frequency, the number of times that the self-moving robot crosses over the first type of obstacle can be reduced, the damage on the self-moving robot caused in the process of crossing over the first type of obstacle is reduced, and the service time of the self-moving robot is prolonged.

Through crossing over the second type of obstacle based on the second obstacle crossing frequency, the second target area behind the second type of obstacle is cleaned, and the second obstacle crossing frequency is less than the preset cleaning frequency, such that the number of times the self-moving robot crosses over the second type of obstacle can be reduced, the damage on the self-moving robot caused in the process of crossing over the second type of obstacle is reduced, and the service life of the self-moving robot is prolonged. At the same time, it also reduces the number of times that the self-moving robot starts the active obstacle crossing component. Since it takes a certain time to start the active obstacle crossing component to cross over the second type of obstacle, this method saves cleaning time and improves cleaning efficiency.

The first target area and the second target area do not need to be cleaned every time, and through compromise consideration, the self-moving robot does not need to cross over the first type of obstacle or the second type of obstacle to clean the first target area or the second target area every time it performs a cleaning task. The number of times that the self-moving robot crosses over the first type of obstacle (when the first obstacle crossing frequency is less than the preset cleaning frequency) or the second type of obstacle is reduced, the obstacle crossing damage on the self-moving robot is reduced, the times of starting the active obstacle crossing component are reduced, and the service life of the self-moving robot and the active obstacle crossing component is prolonged. Considering that the obstacle crossing process takes a certain time, this method also saves the cleaning time, optimizes the cleaning efficiency, while taking the cleaning of the first target area and the second target area into account.

The obstacle crossing system of the self-moving robot shown in FIG. 5 can execute the obstacle crossing method for a self-moving robot provided by any one of the aforementioned embodiments shown in FIG. 2 to FIG. 4. For the parts not described in detail in this embodiment, please refer to the relevant descriptions of the embodiments shown in FIG. 2 to FIG. 4, which are not repeated here.

The present disclosure also discloses a self-moving robot, which comprises the obstacle crossing system, and executes the obstacle crossing method for a self-moving robot provided by any one of the aforementioned embodiments shown in FIG. 2 to FIG. 4. Please refer to the relevant descriptions of the embodiments shown in FIG. 2 to FIG. 5, which are not repeated here.

The present disclosure also discloses a computer program product. The computer program product may include a computer-readable storage medium loaded with computer-readable program instructions for causing a processor to realize the obstacle crossing method for a self-moving robot of the present disclosure.

The computer-readable storage medium may be a tangible device that can retain and store instructions used by an instruction execution device. The computer-readable storage medium can be, for example, but not limited to, an electrical storage device, a magnetic storage device, an optical storage device, an electromagnetic storage device, a semiconductor storage device or any suitable combination of the above. More specific examples of the computer-readable storage medium (a non-exhaustive list) include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device, such as a punch card or a raised structure in a groove on which instructions are stored, and any suitable combination of the above. The computer-readable storage medium used here is not interpreted as an instantaneous signal itself, such as radio waves or other freely propagating electromagnetic waves, electromagnetic waves propagating through waveguides or other transmission media (for example, optical pulses through optical fiber cables), or electrical signals transmitted through a wire.

The computer-readable program instructions described here can be downloaded from a computer-readable storage medium to various computing/processing devices, or downloaded to an external computer or an external storage device through a network, such as the Internet, a local area network, a wide area network and/or a wireless network. The network may include copper transmission cables, optical fiber transmission, wireless transmission, routers, firewalls, switches, gateway computers and/or edge servers. A network adapter card or a network interface in each computing/processing device receives computer-readable program instructions from the network and forwards the computer-readable program instructions for storage in the computer-readable storage medium in each computing/processing device.

The computer program instructions for executing the obstacle crossing method for a self-moving robot of the present disclosure can be assembly instructions, instruction set architecture (ISA) instructions, machine instructions, machine-related instructions, a microcode, firmware instructions, state setting data, or a source code or object code written in any combination of one or more programming languages, where the programming languages include object-oriented programming languages such as Smalltalk and C++, and conventional procedural programming languages such as "C" language or similar programming languages. Computer-readable program instructions may be completely executed on a user computer, partially executed on a user computer, executed as an independent software package, partially executed on a user computer and partially executed on a remote computer, or completely executed on a remote computer or server. In the case involving a remote computer, the remote computer can be connected to a user computer through any kind of network, including a local area network (LAN) or a wide area network (WAN), or can be connected to an external computer (for example, connection through the Internet with an Internet service provider). In some embodiments, an electronic circuit, such as a programmable logic circuit, a field programmable gate array (FPGA) or a programmable logic array (PLA), are customized by utilizing state information of computer-readable program instructions, and the electronic circuit can execute computer-readable program instructions, thereby realizing various aspects of the present disclosure.

Various aspects of the obstacle crossing method for a self-moving robot of the present disclosure are described here with reference to flowcharts and/or block diagrams of methods, devices (systems) and computer program products according to embodiments of the present disclosure. It should be understood that each block of the flowcharts and/or block diagrams and combinations of blocks in the flowcharts and/or block diagrams can be implemented by computer-readable program instructions.

These computer-readable program instructions may be provided to a processor of a general-purpose computer, a special-purpose computer or other programmable data processing apparatuses to produce a machine, such that these instructions, when executed by a processor of a computer or other programmable data processing apparatuses, produce an apparatus for implementing the functions/actions specified in one or more blocks in the flowcharts and/or the block diagram blocks. These computer-readable program instructions may also be stored in a computer-readable storage medium, where the instructions cause the computer, the programmable data processing apparatus and/or other devices to function in a particular manner, such that the computer-readable medium having the instructions stored thereon includes an article of manufacture, which includes instructions for implementing various aspects of the functions/actions specified in one or more blocks in the flowcharts and/or the block diagrams.

Computer-readable program instructions may also be loaded onto a computer, other programmable data processing apparatuses or other devices, such that a series of operation steps are performed on the computer, other programmable data processing apparatuses or other devices to produce a computer-implemented process, such that the instructions executed on the computer, other programmable data processing apparatuses or other devices implement the functions/actions specified in one or more blocks in the flowcharts and/or the block diagrams.

The flowcharts and the block diagrams in the drawings show architecture, functions and operations of possible implementations of systems, methods and computer program products according to various embodiments of the present disclosure. In this regard, each block in the flowcharts or the block diagrams may represent a module, a program segment or a part of the instructions. The module, the program segment or the part of the instructions contains one or more executable instructions for implementing specified logical functions. In some alternative implementations, functions noted in the blocks may also occur in a different order than those noted in the drawings. For example, two consecutive blocks may actually be executed substantially in parallel, and they may sometimes be executed in a reverse order, depending on the functions involved. It should also be noted that each block in the block diagrams and/or the flowcharts, and combinations of blocks in the block diagrams and/or flowcharts, can be implemented by a dedicated hardware-based system that performs specified functions or actions, or be implemented by a combination of dedicated hardware and computer instructions.

Embodiments of the present disclosure have been described above, and the above description is exemplary, not exhaustive, and is not limited to the disclosed embodiments. Many modifications and changes will be obvious to those of ordinary skill in the art without departing from the scope and spirit of the illustrated embodiments. The terms used herein are intended to best explain the principles of the embodiments, practical applications or technical improvements in the market, or to enable other ordinary technicians in the art to understand the embodiments disclosed herein.

What is claimed is:

1. An obstacle crossing method for a self-moving robot, wherein the self-moving robot comprises an active obstacle crossing component and performs a cleaning task based on a preset cleaning frequency, and the method comprises:
   identifying a type of an obstacle, and determining whether the obstacle is a first type of obstacle or a second type of obstacle according to a height rule, wherein a height of the first type of obstacle is less than a first height, and a height of the second type of obstacle is greater than the first height and less than a second height;
   acquiring a first obstacle crossing frequency corresponding to the first type of obstacle, crossing over or not crossing over the first type of obstacle based on the first obstacle crossing frequency, and cleaning a first target area behind the first type of obstacle when crossing over the first type of obstacle; continuing to perform the cleaning task when not crossing over the first type of obstacle, wherein the first obstacle crossing frequency is less than or equal to the preset cleaning frequency;
   acquiring a second obstacle crossing frequency corresponding to the second type of obstacle, crossing over or not crossing over the second type of obstacle based on the second obstacle crossing frequency, and cleaning a second target area behind the second type of obstacle when crossing over the second type of obstacle; continuing to perform the cleaning task when not crossing over the second type of obstacle, wherein the second obstacle crossing frequency is less than the preset cleaning frequency, so as to reduce a number of times that the self-moving robot starts the active obstacle crossing component and a number of times that the self-moving robot crosses over the second type of obstacle.

2. The method according to claim 1, wherein the first obstacle crossing frequency is a frequency at which the self-moving robot directly crosses over the first type of obstacle, and the second obstacle crossing frequency is a frequency at which the self-moving robot crosses over the second type of obstacle through the active obstacle crossing component, such that the self-moving robot executes different obstacle crossing strategies on the first type of obstacle and the second type of obstacle.

3. The method according to claim 1, wherein the first height is a maximum height of an obstacle that is crossed over by the self-moving robot without starting the active obstacle crossing component, and the second height is a maximum height of an obstacle that is crossed over by the self-moving robot when starting the active obstacle crossing component.

4. The method according to claim 1, wherein there are a plurality of first types of obstacles, each of the first types of obstacles correspond to a first obstacle crossing frequency, and there are a plurality of second types of obstacles, each of the second types of obstacles comprises a second obstacle crossing frequency, so as to execute different obstacle crossing strategies for different obstacles.

5. The method according to claim 1, wherein the second obstacle crossing frequency is less than the first obstacle crossing frequency, so as to reduce a number of times that the self-moving robot crosses over the second type of obstacle and a number of times that the active obstacle crossing component is started.

6. The method according to claim 1, wherein the continuing to perform the cleaning task when not crossing over the first type of obstacle comprises:
adding a first virtual wall corresponding to the first type of obstacle in a cleaning map corresponding to the cleaning task;
performing a first path planning based on the first virtual wall and a remaining cleaning task;
not crossing over the first type of obstacle based on the first path planning, and completing the remaining cleaning task.

7. The method according to claim 1, wherein the continuing to perform the cleaning task when not crossing over the second type of obstacle comprises:
adding a second virtual wall corresponding to the second type of obstacle in a cleaning map corresponding to the cleaning task;
performing a second path planning based on the second virtual wall and a remaining cleaning task;
not crossing over the second type of obstacle based on the second path planning, and completing the remaining cleaning task.

8. The method according to claim 1, wherein the cleaning the second target area behind the second type of obstacle when crossing over the second type of obstacle comprises:
when moving within a preset distance from the second type of obstacle, starting the active obstacle crossing component to raise a height of at least part of a bottom of the self-moving robot, such that the self-moving robot crosses over the second type of obstacle with a height greater than the first height and less than the second height.

9. The method according to claim 1, wherein the height of the first type of obstacle and the height of the second type of obstacle are determined by a structured light module in the self-moving robot by collecting point cloud data of the first type of obstacle and point cloud data of the second type of obstacle respectively, so as to improve accuracy of determined height of the first type of obstacle and height of the second type of obstacle.

10. A self-moving robot, wherein the self-moving robot comprises an active obstacle crossing component, and the self-moving robot further comprises a memory and a processor, wherein the memory stores a computer program which, when executed by the processor, causes the processor to:
identify a type of an obstacle, and determine whether the obstacle is a first type of obstacle or a second type of obstacle according to a height rule, wherein a height of the first type of obstacle is less than a first height, and a height of the second type of obstacle is greater than the first height and less than a second height;
acquire a first obstacle crossing frequency corresponding to the first type of obstacle, cross over or not cross over the first type of obstacle based on the first obstacle crossing frequency, and clean a first target area behind the first type of obstacle when crossing over the first type of obstacle; continue to perform a cleaning task when not crossing over the first type of obstacle, wherein the first obstacle crossing frequency is less than or equal to a preset cleaning frequency;
acquire a second obstacle crossing frequency corresponding to the second type of obstacle, cross over or not cross over the second type of obstacle based on the second obstacle crossing frequency, and clean a second target area behind the second type of obstacle when crossing over the second type of obstacle; continue to perform the cleaning task when not crossing over the second type of obstacle, wherein the second obstacle crossing frequency is less than the preset cleaning frequency, so as to reduce a number of times that the self-moving robot starts the active obstacle crossing component and a number of times that the self-moving robot crosses over the second type of obstacle;
wherein the preset cleaning frequency is a frequency at which the self-moving robot performs the cleaning task.

11. The self-moving robot according to claim 10, wherein the first obstacle crossing frequency is a frequency at which the self-moving robot directly crosses over the first type of obstacle, and the second obstacle crossing frequency is a frequency at which the self-moving robot crosses over the second type of obstacle through the active obstacle crossing component, such that the self-moving robot executes different obstacle crossing strategies on the first type of obstacle and the second type of obstacle.

12. The self-moving robot according to claim 10, wherein the first height is a maximum height of an obstacle that is crossed over by the self-moving robot without starting the active obstacle crossing component, and the second height is a maximum height of an obstacle that is crossed over by the self-moving robot when starting the active obstacle crossing component.

13. The self-moving robot according to claim 10, wherein there are a plurality of first types of obstacles, each of the first types of obstacles comprises a first obstacle crossing frequency, and there are a plurality of second types of obstacles, each of the second types of obstacles comprises a second obstacle crossing frequency, so as to execute different obstacle crossing strategies for different obstacles.

14. The self-moving robot according to claim 10, wherein the second obstacle crossing frequency is less than the first obstacle crossing frequency, so as to reduce a number of times that the self-moving robot crosses over the second type of obstacle and a number of times that the active obstacle crossing component is started.

15. The self-moving robot according to claim 10, wherein the computer program further causes the processor to:
- add a first virtual wall corresponding to the first type of obstacle in a cleaning map corresponding to the cleaning task;
- perform a first path planning based on the first virtual wall and a remaining cleaning task;
- not cross over the first type of obstacle based on the first path planning, and complete the remaining cleaning task.

16. The self-moving robot according to claim 10, wherein the computer program further causes the processor to:
- add a second virtual wall corresponding to the second type of obstacle in a cleaning map corresponding to the cleaning task;
- perform a second path planning based on the second virtual wall and a remaining cleaning task;
- not cross over the second type of obstacle based on the second path planning, and complete the remaining cleaning task.

17. The self-moving robot according to claim 10, wherein when the self-moving robot moves within a preset distance from the second type of obstacle, the computer program further causes the processor to:
- start the active obstacle crossing component to raise a height of at least part of a bottom of the self-moving robot, such that the self-moving robot crosses over the second type of obstacle with a height greater than the first height and less than the second height.

18. The self-moving robot according to claim 10, wherein the height of the first type of obstacle and the height of the second type of obstacle are determined by a structured light module in the self-moving robot by collecting point cloud data of the first type of obstacle and point cloud data of the second type of obstacle respectively, so as to improve accuracy of determined height of the first type of obstacle and height of the second type of obstacle.

19. A non-transitory computer-readable storage medium, storing a computer program which, when executed by a processor, causes the processor to implement the following:
- identifying a type of an obstacle, and determining whether the obstacle is a first type of obstacle or a second type of obstacle according to a height rule, wherein a height of the first type of obstacle is less than a first height, and a height of the second type of obstacle is greater than the first height and less than a second height;
- acquiring a first obstacle crossing frequency corresponding to the first type of obstacle, crossing over or not crossing over the first type of obstacle based on the first obstacle crossing frequency, and cleaning a first target area behind the first type of obstacle when crossing over the first type of obstacle; continuing to perform a cleaning task when not crossing over the first type of obstacle, wherein the first obstacle crossing frequency is less than or equal to a preset cleaning frequency;
- acquiring a second obstacle crossing frequency corresponding to the second type of obstacle, crossing over or not crossing over the second type of obstacle based on the second obstacle crossing frequency, and cleaning a second target area behind the second type of obstacle when crossing over the second type of obstacle; continuing to perform the cleaning task when not crossing over the second type of obstacle, wherein the second obstacle crossing frequency is less than the preset cleaning frequency, so as to reduce a number of times that a self-moving robot starts an active obstacle crossing component and a number of times that the self-moving robot crosses over the second type of obstacle;
- wherein the self-moving robot comprises the active obstacle crossing component and the preset cleaning frequency is a frequency at which the self-moving robot performs the cleaning task.

20. The storage medium according to claim 19, wherein the first obstacle crossing frequency is a frequency at which the self-moving robot directly crosses over the first type of obstacle, and the second obstacle crossing frequency is a frequency at which the self-moving robot crosses over the second type of obstacle through the active obstacle crossing component, such that the self-moving robot executes different obstacle crossing strategies on the first type of obstacle and the second type of obstacle.

\* \* \* \* \*